(12) United States Patent
Suzuki

(10) Patent No.: US 9,973,018 B2
(45) Date of Patent: May 15, 2018

(54) ELECTRIC STORAGE SYSTEM

(71) Applicant: TOYOTA JIDOSHA KABUSHIKI KAISHA, Toyota-shi, Aichi (JP)

(72) Inventor: Yusuke Suzuki, Nagakute (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 144 days.

(21) Appl. No.: 15/022,034

(22) PCT Filed: Nov. 28, 2014

(86) PCT No.: PCT/JP2014/005979
§ 371 (c)(1),
(2) Date: Mar. 15, 2016

(87) PCT Pub. No.: WO2015/092986
PCT Pub. Date: Jun. 25, 2015

(65) Prior Publication Data
US 2016/0233693 A1 Aug. 11, 2016

(30) Foreign Application Priority Data
Dec. 18, 2013 (JP) ................. 2013-261429

(51) Int. Cl.
*H02J 7/00* (2006.01)
*H02J 7/14* (2006.01)
(Continued)

(52) U.S. Cl.
CPC .......... *H02J 7/007* (2013.01); *B60L 11/1861* (2013.01); *H01M 10/44* (2013.01); *H01M 10/46* (2013.01);
(Continued)

(58) Field of Classification Search
CPC ........ H02J 7/007; H02J 7/0029; H02J 7/0068; H02J 7/14; H02J 7/0065; H02J 2007/0037;
(Continued)

(56) References Cited

U.S. PATENT DOCUMENTS 6,072,300 A * 6/2000 Tsuji ................... G01R 31/362
320/116
6,223,106 B1 * 4/2001 Yano ....................... B60K 6/28
180/165
(Continued)

FOREIGN PATENT DOCUMENTS

EP 1548453 A1 * 6/2005 ......... G01R 31/3624
EP 2 019 468 A1 1/2009
(Continued)

OTHER PUBLICATIONS

International Search Report for PCT/JP2014/005979 dated Apr. 9, 2015 [PCT/ISA/210].

*Primary Examiner* — Phallaka Kik
(74) *Attorney, Agent, or Firm* — Sughrue Mion, PLLC

(57) ABSTRACT

A reference voltage value is calculated by using a current value, a voltage value, and an internal resistance value of an electric storage apparatus. A dischargeable electric power is calculated by using the reference voltage value and a predetermined internal resistance value previously set to be higher than the internal resistance value. The dischargeable electric power is set as an allowable discharge electric power when temporarily increasing the discharge electric power required of the electric storage apparatus. The reference voltage value is calculated from the internal resistance value and is a fixed value regardless of the relationship between the current value and the voltage value. The dischargeable electric power is also constant. Since the predetermined internal resistance value is higher than the internal resistance (Continued)

value, the dischargeable electric power can be set while the deterioration of the electric storage apparatus is taken into account.

10 Claims, 9 Drawing Sheets

(51) Int. Cl.
  B60L 11/00 (2006.01)
  H01M 10/44 (2006.01)
  H01M 10/46 (2006.01)
  H01M 10/48 (2006.01)
  B60L 11/18 (2006.01)
  H01M 10/42 (2006.01)
(52) U.S. Cl.
  CPC .......... *H01M 10/48* (2013.01); *H02J 7/0029* (2013.01); *H02J 7/0068* (2013.01); *H02J 7/14* (2013.01); *H01M 2010/4271* (2013.01); *H02J 7/0065* (2013.01); *H02J 2007/0037* (2013.01); *H02J 2007/0039* (2013.01); *H02J 2007/0067* (2013.01); *Y02T 10/705* (2013.01); *Y02T 10/7005* (2013.01); *Y02T 10/7044* (2013.01)
(58) Field of Classification Search
  CPC ...... H02J 2007/0039; H02J 2007/0067; B60L 11/1861; H01M 10/44; H01M 10/46; H01M 10/48; H01M 2010/4271; Y02T 10/7005; Y02T 10/7044; Y02T 10/705
  USPC ................ 320/134, 136, 152, 159, 162, 166
  See application file for complete search history.

(56) References Cited

U.S. PATENT DOCUMENTS

| | | | | |
|---|---|---|---|---|
| 7,091,698 B2* | 8/2006 | Yamazaki | ........ | G01R 31/3648 320/132 |
| 7,485,383 B2* | 2/2009 | Aoyagi | ........ | H01M 8/04089 320/101 |
| 7,583,053 B2* | 9/2009 | Kamohara | ........ | B60K 6/48 320/106 |
| 7,777,446 B2* | 8/2010 | Ueda | ........ | H02J 7/1438 320/104 |
| 2003/0236601 A1* | 12/2003 | McLeod | ........ | G07C 5/008 701/31.4 |
| 2004/0232884 A1* | 11/2004 | Vaillancourt | ........ | G01R 31/3655 320/132 |
| 2005/0017686 A1* | 1/2005 | Sakakibara | ........ | G01R 31/3679 320/132 |
| 2006/0158155 A1* | 7/2006 | Tamezane | ........ | G01R 31/3651 320/132 |
| 2008/0030169 A1* | 2/2008 | Kamishima | ........ | G01R 31/361 320/134 |
| 2008/0258895 A1* | 10/2008 | Yamaguchi | ........ | G07C 5/0816 340/455 |
| 2009/0051364 A1* | 2/2009 | Ishida | ........ | G01R 31/3662 324/430 |
| 2009/0266631 A1 | 10/2009 | Kikuchi | | |
| 2010/0085019 A1* | 4/2010 | Masuda | ........ | H02J 7/1453 320/152 |
| 2010/0269776 A1* | 10/2010 | Mizuno | ........ | F02D 29/06 123/179.4 |
| 2012/0176091 A1* | 7/2012 | Abe | ........ | H01M 10/486 320/132 |
| 2012/0274285 A1* | 11/2012 | Chawla | ........ | H01M 10/44 320/127 |
| 2012/0306450 A1* | 12/2012 | Nakayama | ........ | G06F 1/263 320/134 |
| 2014/0100803 A1* | 4/2014 | Sekiguchi | ........ | G01R 31/3648 702/63 |
| 2015/0355288 A1* | 12/2015 | Yokoyama | ........ | H01M 10/4285 702/63 |

FOREIGN PATENT DOCUMENTS

| | | | | |
|---|---|---|---|---|
| EP | 2 352 199 A1 | | 8/2011 | |
| JP | 9-218251 A | | 8/1997 | |
| JP | 11317243 A | * | 11/1999 | ............ H01M 10/42 |
| JP | 2003346919 A | * | 12/2003 | ......... G01R 31/3662 |
| JP | 2005189028 A | * | 7/2005 | ......... G01R 31/3651 |
| JP | 2007-306771 A | | 11/2007 | |
| JP | 2008292272 A | * | 12/2008 | ............. G01R 31/36 |
| JP | 2010-35332 A | | 2/2010 | |
| JP | 2011-252821 A | | 12/2011 | |
| WO | 2013/080023 A1 | | 6/2013 | |

* cited by examiner

[Fig. 1]
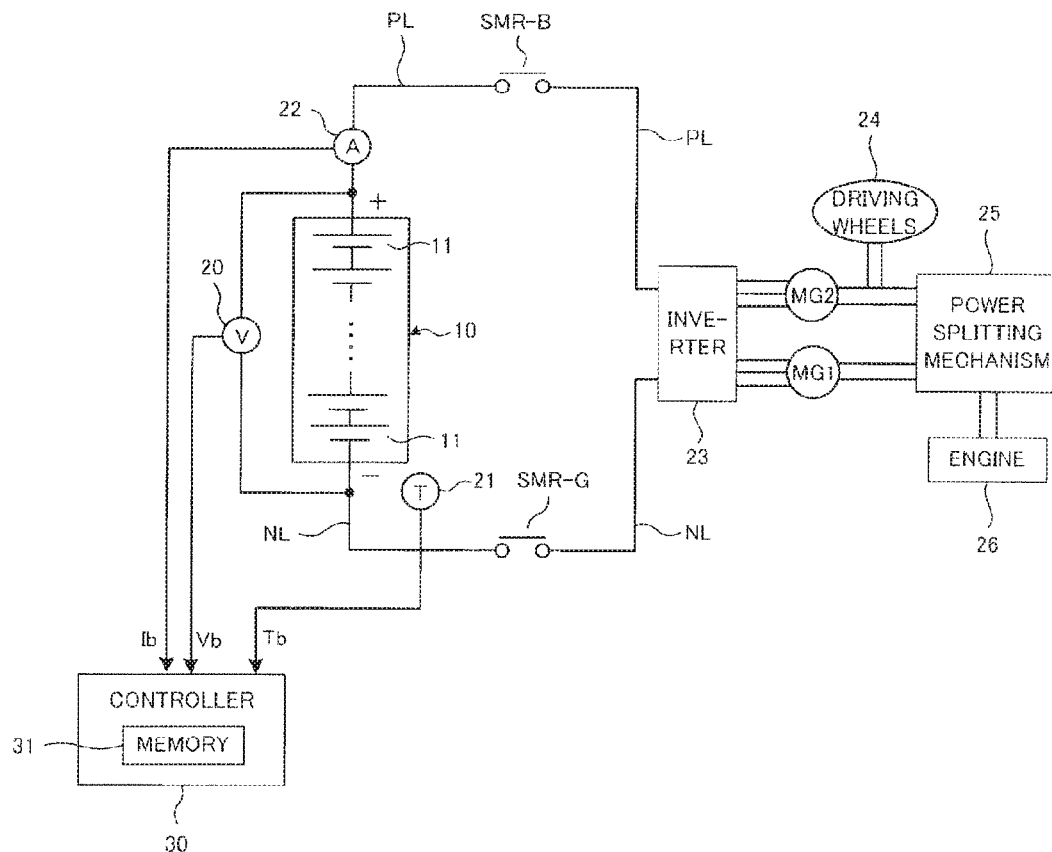
[Fig. 2]
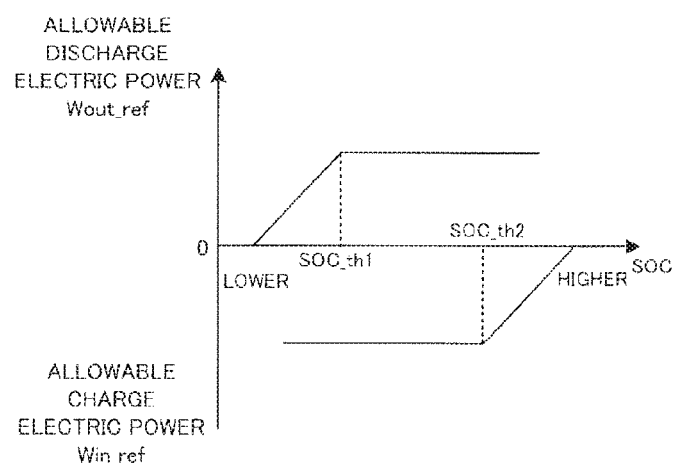

[Fig. 3]
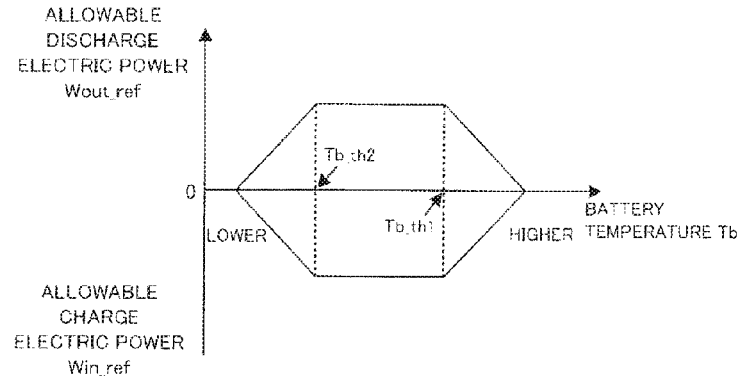
[Fig. 4]
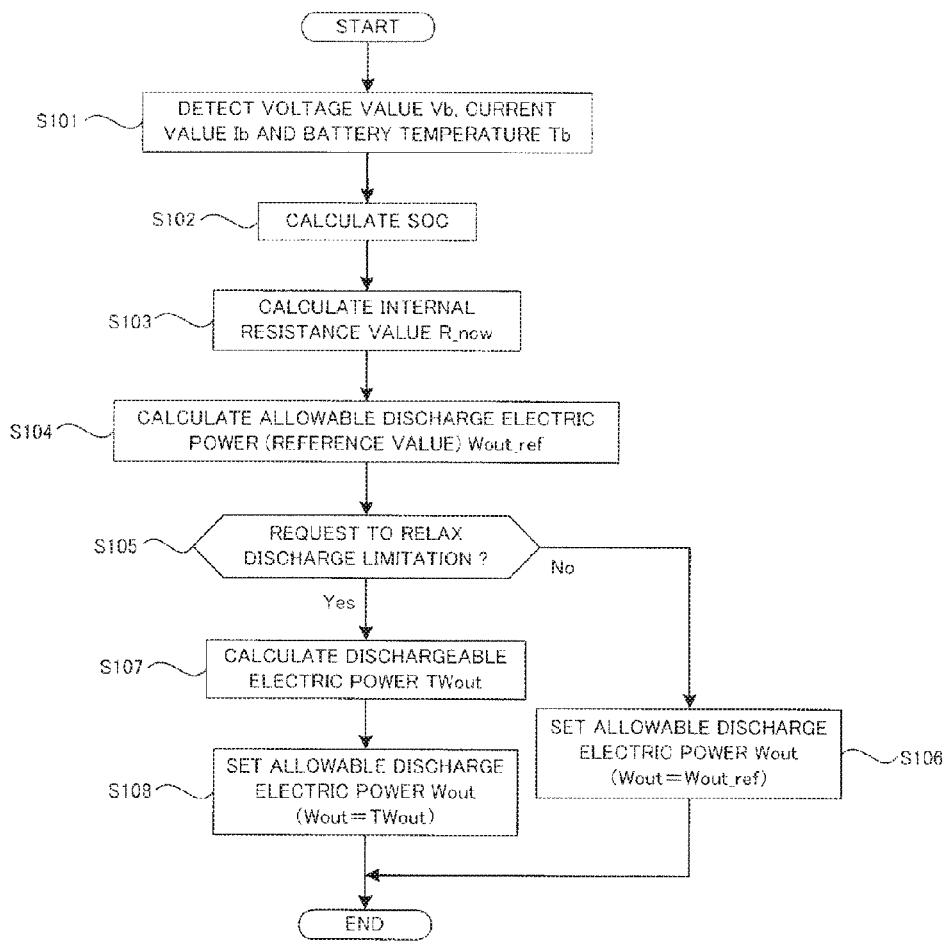

[Fig. 5]
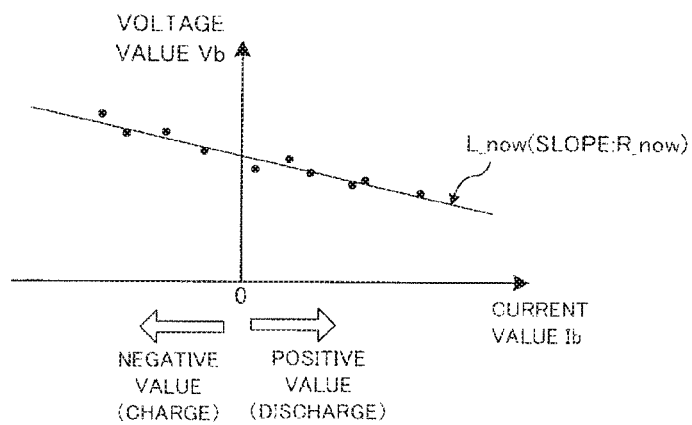
[Fig. 6]
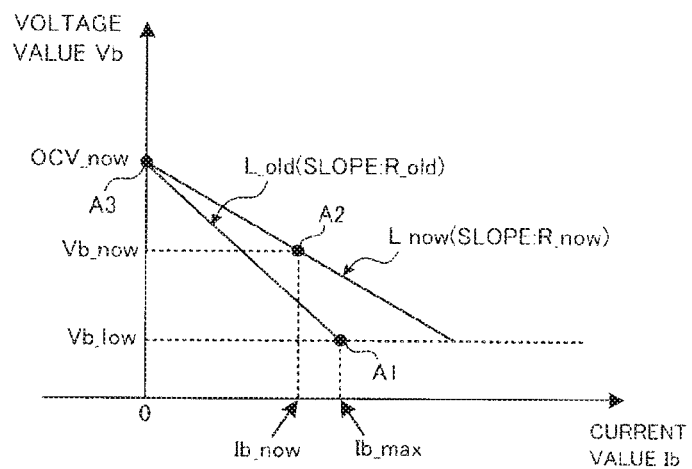

[Fig. 7]
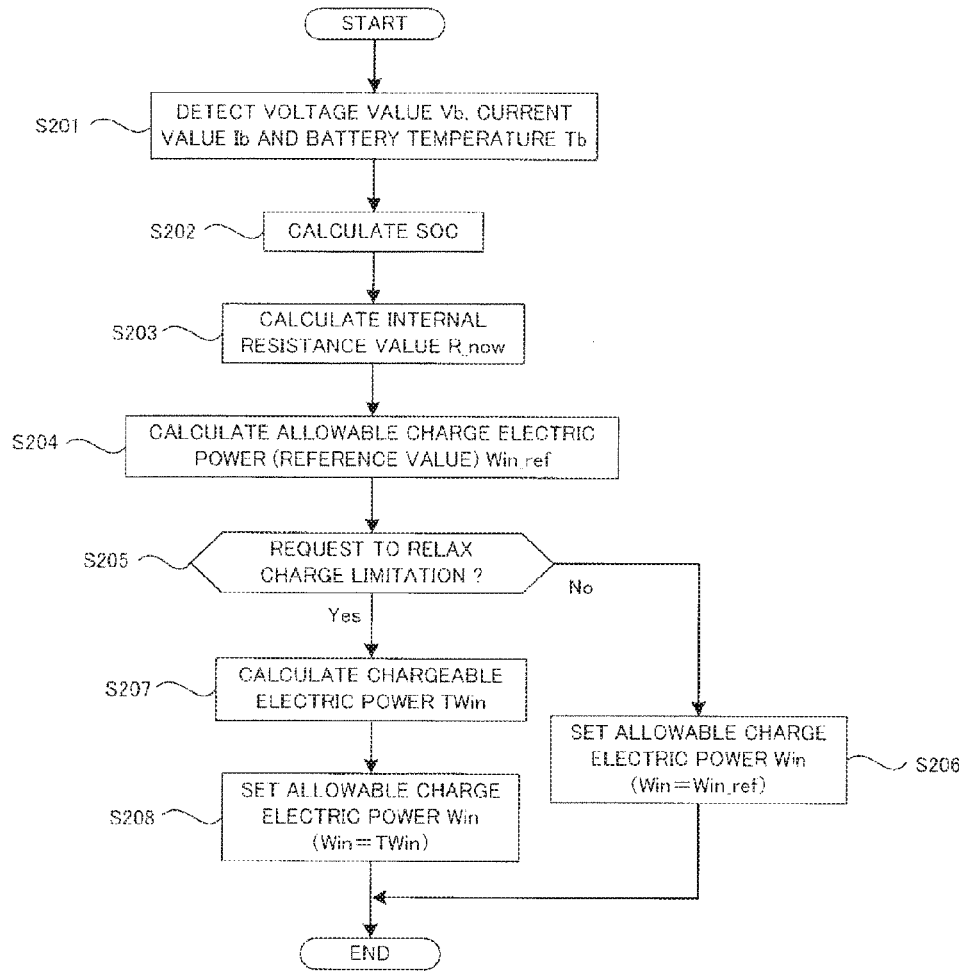
[Fig. 8]
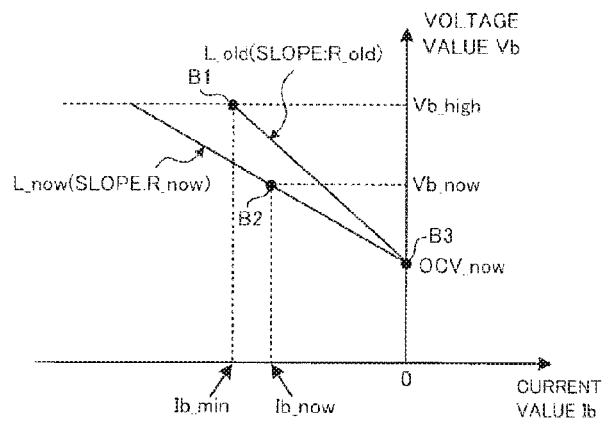

[Fig. 9]
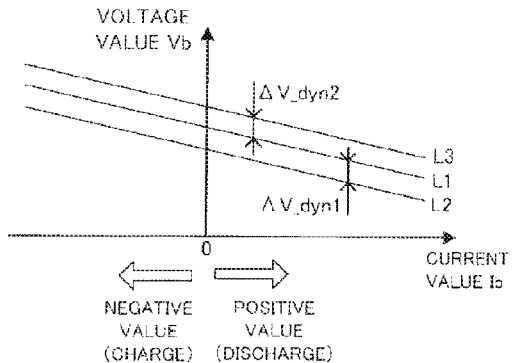
[Fig. 10]
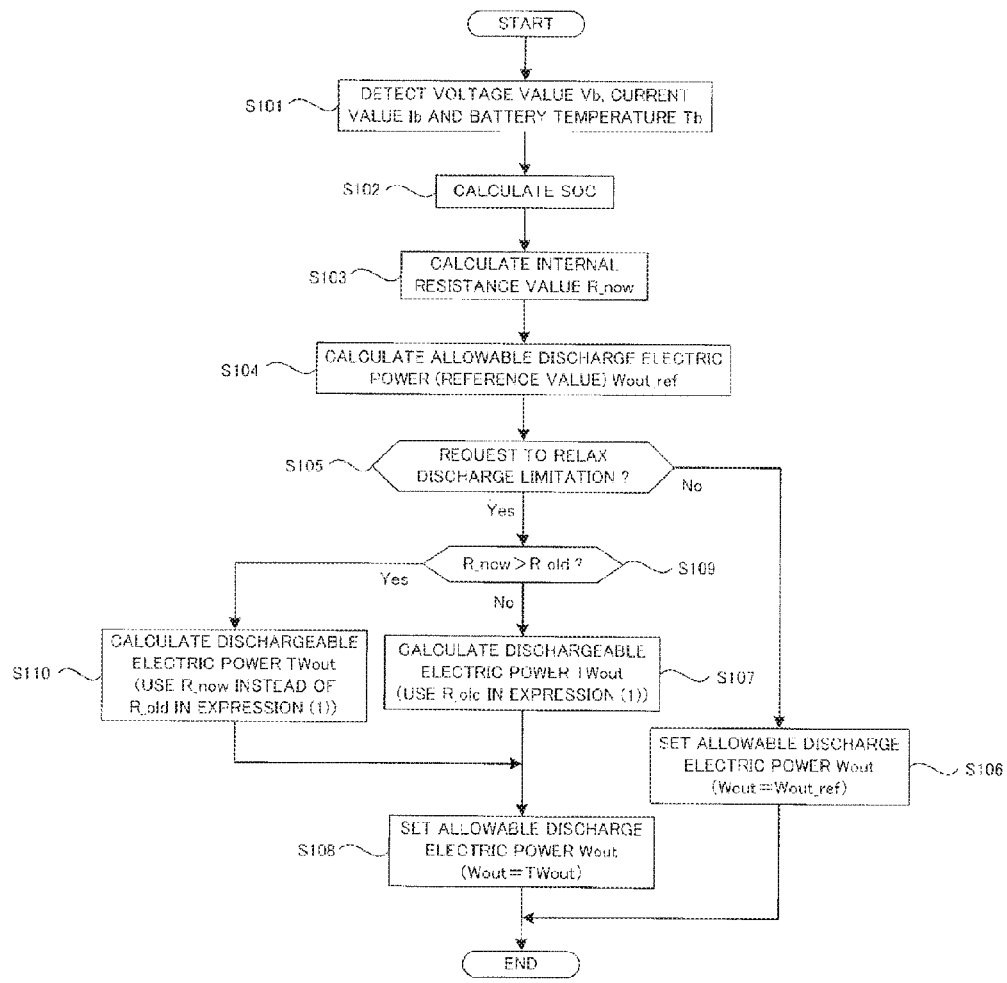

[Fig. 11]
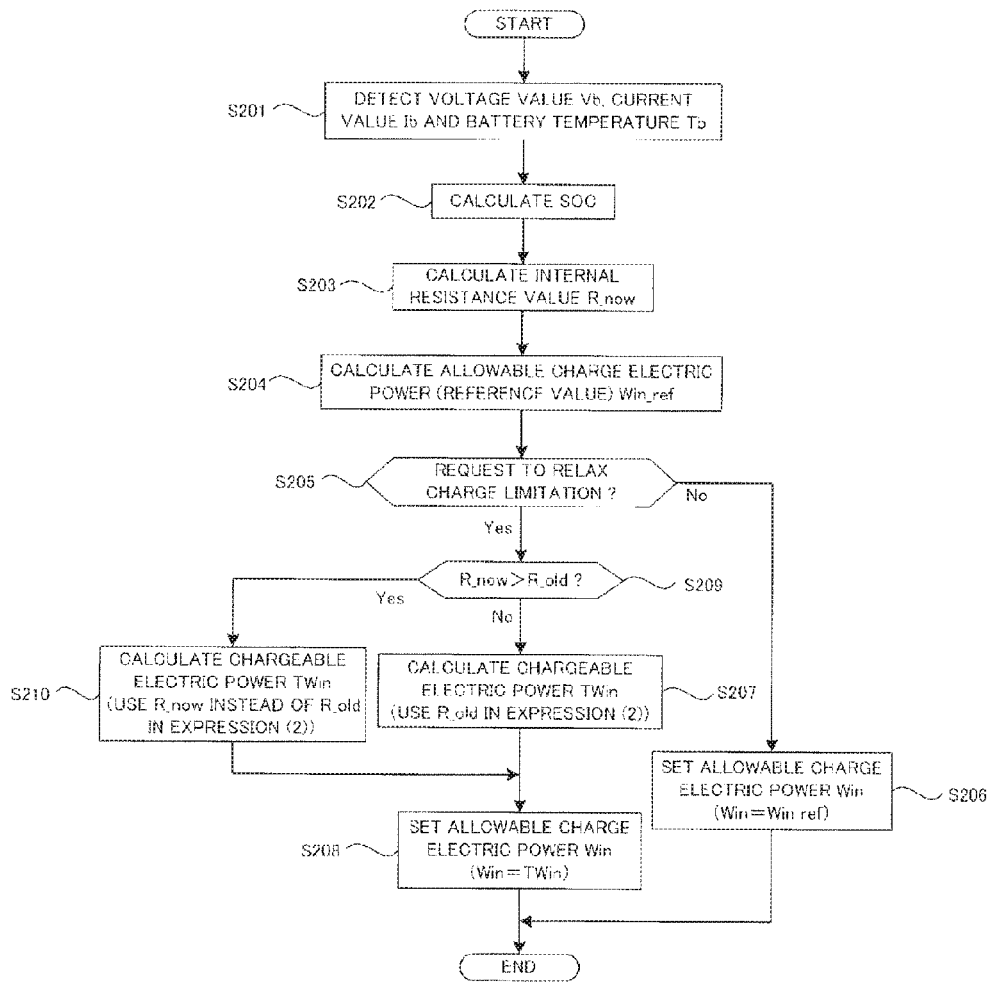
[Fig. 12]
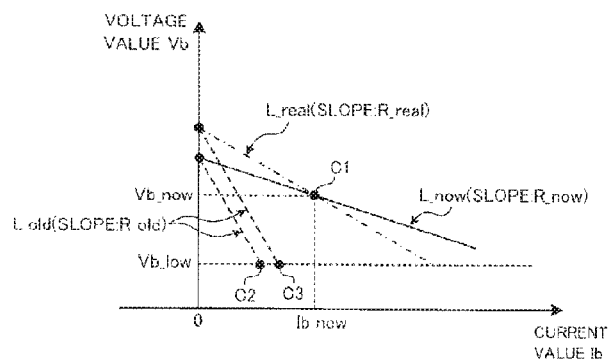

[Fig. 13]
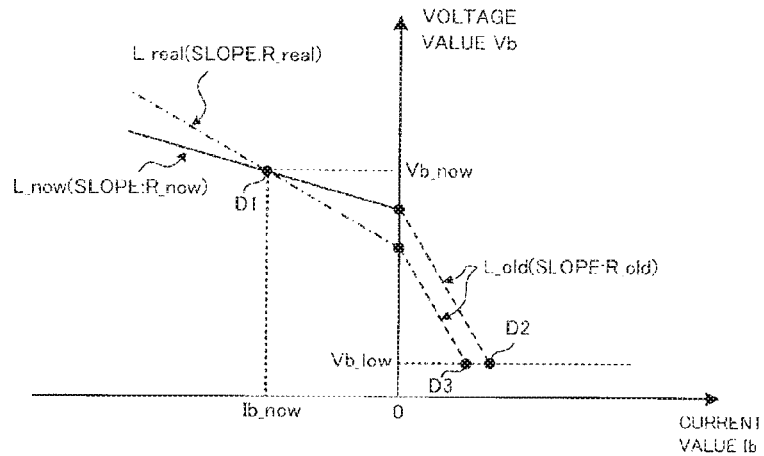
[Fig. 14]
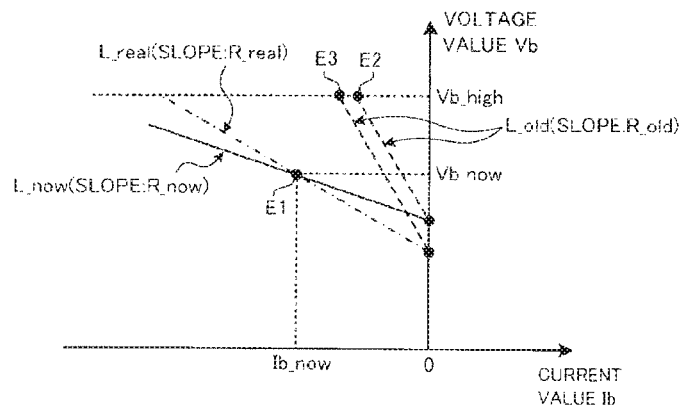
[Fig. 15]
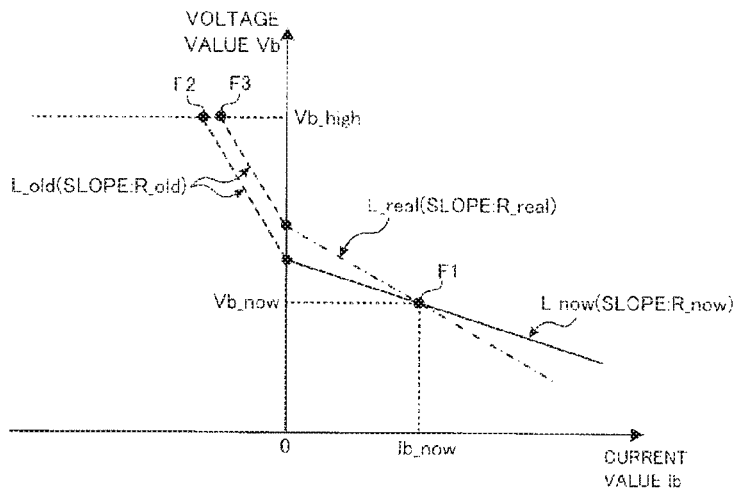

[Fig. 16]
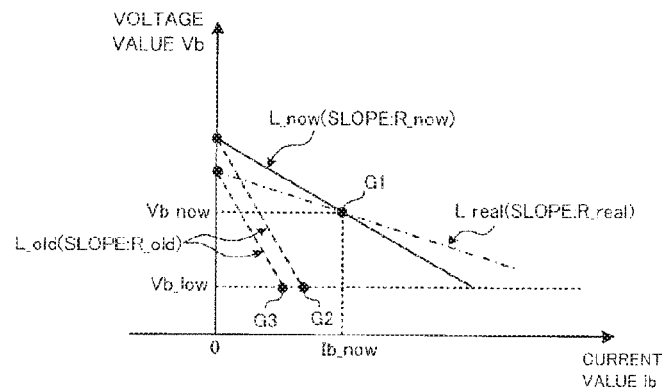
[Fig. 17]
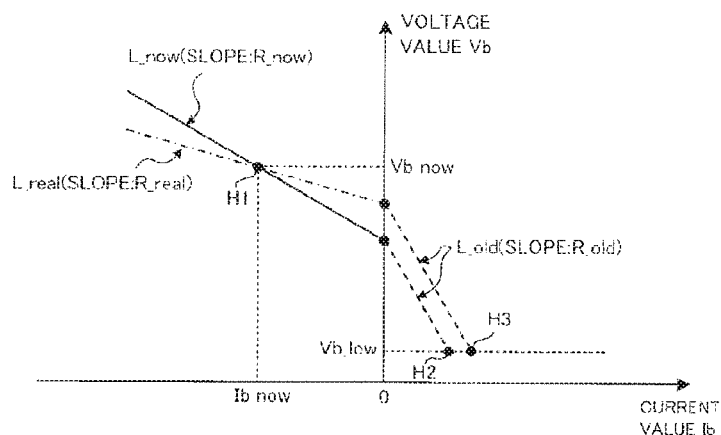
[Fig. 18]
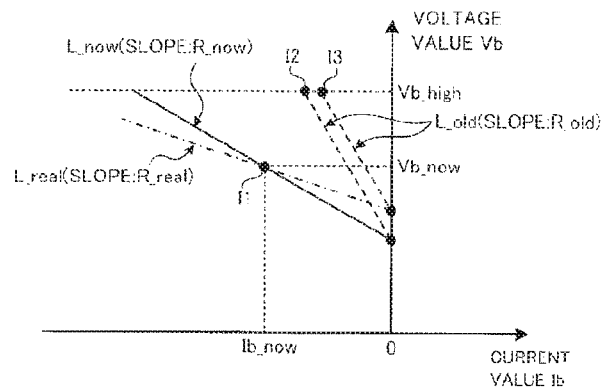

[Fig. 19]
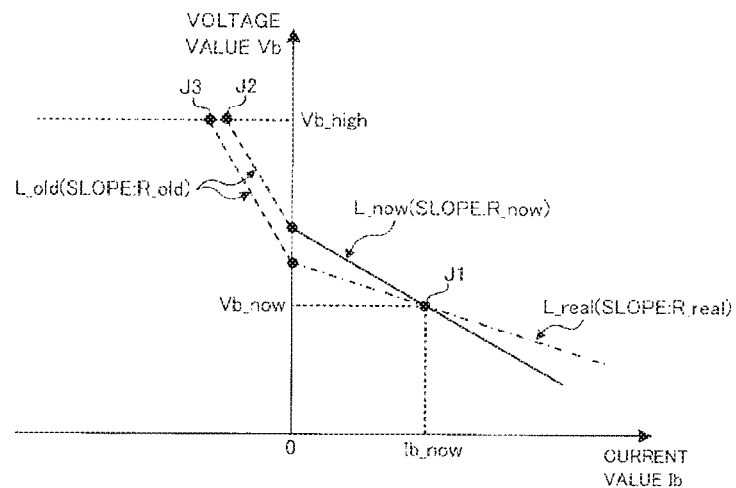
[Fig. 20]
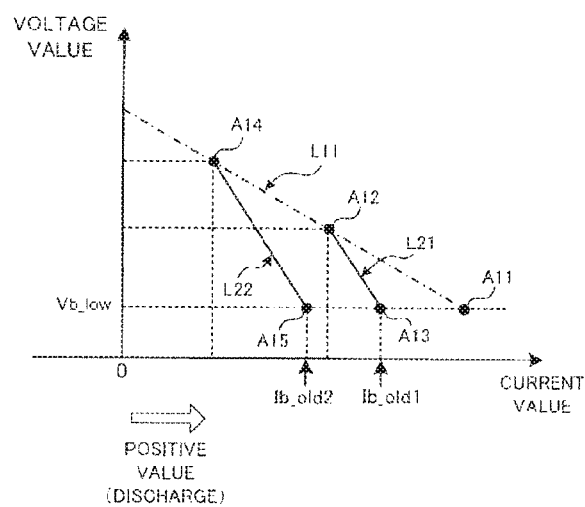

ELECTRIC STORAGE SYSTEM

CROSS REFERENCE TO RELATED APPLICATIONS

This application is a National Stage of International Application No. PCT/JP2014/005979 filed Nov. 28, 2014, claiming priority based on Japanese Patent Application No. 2013-261429, filed Dec. 18, 2013, the contents of all of which are incorporated herein by reference in their entirety.

TECHNICAL FIELD

The present invention relates to an electric storage system in which an upper limit electric power is set for allowing discharge of an electric storage apparatus and an upper limit electric power is set for allowing charge of the electric storage apparatus.

BACKGROUND ART

In Patent Document 1, an allowable discharge electric power is calculated for use in temporarily relaxing limitation on discharge. Specifically, the current value (maximum dischargeable current value) of a battery found when the discharge electric power of the battery is increased until the voltage value of the battery reaches a lower limit voltage value is calculated on the basis of the present current value, the present voltage value and the present internal resistance value of the battery. The allowable discharge electric power (maximum dischargeable electric power) is obtained by multiplying the maximum dischargeable current value by the lower limit voltage value.

CITATION LIST

Patent Literature

[PTL 1] Japanese Patent No. 4961830

SUMMARY OF INVENTION

Technical Problem

It is known that a battery is deteriorated over time or by repeated charge and discharge. As the deterioration of the battery proceeds, the internal resistance value of the battery increases. Thus, the allowable discharge electric power is preferably calculated by taking account of the internal resistance value after the deterioration of the battery. When the internal resistance value after deterioration is used instead of the present internal resistance value in calculating the allowable discharge electric power based on Patent Document 1, the allowable discharge electric power varies depending on the relationship between the present current value and the present voltage value.

FIG. 20 shows a relationship between the current value and the voltage value of a battery during charge and discharge. In FIG. 20, the vertical axis represents the voltage value of the battery and the horizontal axis represents the current value of the battery. The current values provided during discharge of the battery are set to positive values.

In FIG. 20, a straight line (chain line) L11 represents the relationship between the current value and voltage value of the battery during charge and discharge. The slope of the straight line L11 indicates the present internal resistance value of the battery. When the present internal resistance value is taken into account as described in Patent Document 1, the allowable discharge electric power is calculated by multiplying a current value at a point A11 by a lower limit voltage value Vb_low. Since the current value and voltage value during charge and discharge of the battery are located on the straight line L11, the allowable discharge electric power is calculated on the basis of the point A11 regardless of the relationship between the current value and voltage value.

When the internal resistance value of the battery after deterioration is taken into account instead of the present internal resistance value, a straight line (for example, straight lines L21 and L22) having a greater slope than that of the straight line L11 is used. Since the internal resistance value after deterioration is higher than the present internal resistance value, the slope of the straight lines L21 and L22 is greater than the slope of the straight line L11. The straight lines L21 and L22 have the same slope.

When the present current value and the present voltage value are located at a point A12, a point A13 is determined on the basis of the straight line L21 passing through the point A12. The point A13 indicates the relationship between the lower limit voltage value Vb_low and a current value Ib_old1 associated with the lower limit voltage value Vb_low. A value calculated by multiplying the lower limit voltage value Vb_low by the current value Ib_old1 is the allowable discharge electric power calculated for the point A12.

When the present current value and the present voltage value are located at a point A14, a point A15 is determined on the basis of the straight line L22 passing through the point A14. The point A15 indicates the relationship between the lower limit voltage value Vb_low and a current value Ib_old2 associated with the lower limit voltage value Vb_low. A value calculated by multiplying the lower limit voltage value Vb_low by the current value Ib_old2 is the allowable discharge electric power calculated for the point A14.

Since the current value Ib_old1 is higher than the current value Ib_old2, the allowable discharge electric power at the point A13 is higher than the allowable discharge electric power at the point A15. In this manner, when the internal resistance value after deterioration is used, the allowable discharge electric power varies depending on the relationship between the present current value and the present voltage value.

Solution to Problem

According to a first aspect, the present invention provides an electric storage system including a voltage sensor detecting a voltage value of an electric storage apparatus, a current sensor detecting a current value of the electric storage apparatus, and a controller setting an allowable discharge electric power. The allowable discharge electric power serves as an upper limit electric power to which discharge of the electric storage apparatus is allowed.

The controller uses the voltage value at present, the current value at present, and an internal resistance value at present of the electric storage apparatus to calculate a reference voltage value. The reference voltage value is the voltage value when no current flows. The controller uses the reference voltage value and a predetermined internal resistance value to calculate a dischargeable electric power. The predetermined internal resistance value is a preset value (a constant) previously set to be higher than the internal resistance value at present. The dischargeable electric power is an electric power when a discharge electric power of the electric storage apparatus is increased to cause the voltage value to reach a lower limit voltage value. The controller sets the dischargeable electric power as an allowable discharge electric power for temporarily increasing the discharge electric power required of the electric storage apparatus.

According to the first aspect of the present invention, the dischargeable electric power can be constant regardless of the relationship between the present current value and the present voltage value. This allows the setting of the constant dischargeable electric power regardless of the relationship between the present current value and the present voltage value. The relationship between the current value and the voltage value depends on the present internal resistance value. The reference voltage value is calculated from the present internal resistance value and is a fixed value regardless of the relationship between the current value and the voltage value. Since the predetermined internal resistance value is constant, the dischargeable electric power is constant when the reference voltage value is the fixed value.

The internal resistance value of the electric storage apparatus increases with the deterioration. Since the predetermined internal resistance value is set to be higher than the present internal resistance value, the dischargeable electric power calculated from the predetermined internal resistance value can be lower than the dischargeable electric power calculated from the present internal resistance value. This achieves the setting of the dischargeable electric power in consideration of the deterioration of the electric storage apparatus. The dischargeable electric power can be constant until the internal resistance value of the electric storage apparatus reaches (increases to) the predetermined internal resistance value.

The dischargeable electric power can be calculated on the basis of the following expression (I):

$$TWout = \frac{(Vb\_now + Ib\_now \times R\_now) - Vb\_low}{R\_old} \times Vb\_low \quad (I)$$

In the expression (I), TWout represents the dischargeable electric power, Vb_now represents the voltage value at present, Ib_now represents the current value at present, R_now represents the internal resistance value at present, R_old represents the predetermined internal resistance value, and Vb_low represents the lower limit voltage value.

The internal resistance value at present can be corrected to a value lower than the internal resistance value at present in calculating the present internal resistance value to calculate the dischargeable electric power during discharge of the electric storage apparatus. The present internal resistance value can be calculated, for example on the basis of the current value and the voltage value. When the present internal resistance value is corrected to the value lower than the present internal resistance value, the dischargeable electric power calculated from the corrected internal resistance value is lower than the dischargeable electric power calculated from the present (before correction) internal resistance value.

When the present internal resistance value is calculated (estimated), the present internal resistance value may be higher than an actual internal resistance value (true value) due to a calculation error (estimation error). In this case, the dischargeable electric power calculated from the present internal resistance value is higher than the dischargeable electric power calculated from the actual internal resistance value. If the dischargeable electric power calculated from the present internal resistance value is set as the allowable discharge electric power, the voltage value may fall below the lower limit voltage value. The correction of the present internal resistance value to reduce the dischargeable electric power as described above can prevent the voltage value from falling below the lower limit voltage value.

The internal resistance value at present can be corrected to a value higher than the internal resistance value at present in calculating the present internal resistance value to calculate the dischargeable electric power during charge of the electric storage apparatus. The dischargeable electric power calculated from the corrected internal resistance value is lower than the dischargeable electric power calculated from the present (before correction) internal resistance value.

When the present internal resistance value is calculated (estimated), the present internal resistance value may be lower than an actual internal resistance value (true value) due to a calculation error (estimation error). In this case, the dischargeable electric power calculated from the present internal resistance value is higher than the dischargeable electric power calculated from the actual internal resistance value. This may cause the voltage value to fall below the lower limit voltage value as described above. The correction of the present internal resistance value to reduce the dischargeable electric power as described above can prevent the voltage value from falling below the lower limit voltage value.

Since the predetermined internal resistance value is the predetermined value, the present internal resistance value may be higher than the predetermined internal resistance value depending on the progress of the deterioration of the electric storage apparatus. In this case, the present internal resistance value can be used instead of the predetermined internal resistance value to calculate the dischargeable electric power. This can set the dischargeable electric power associated with the present internal resistance value when the present internal resistance value is higher than the predetermined internal resistance value.

According to a second aspect, the present invention provides an electric storage system including a voltage sensor detecting a voltage value of an electric storage apparatus, a current sensor detecting a current value of the electric storage apparatus, and a controller setting an allowable charge electric power. The allowable charge electric power serves as an upper limit electric power to which charge of the electric storage apparatus is allowed. When an electric power during charge is set to a negative value, a charge electric power in the second aspect of the present invention refers to the absolute value of the charge electric power (negative value).

The controller uses the voltage value at present, the current value at present, and an internal resistance value at present of the electric storage apparatus to calculate a reference voltage value. The reference voltage value is the voltage value when no current flows. The controller uses the reference voltage value and a predetermined internal resistance value to calculate a chargeable electric power. The predetermined internal resistance value is a preset value (a constant) previously set to be higher than the present internal resistance value. The chargeable electric power is an electric power when the charge electric power of the electric storage apparatus is increased to cause the voltage value to reach an upper limit voltage value. The controller sets the chargeable electric power as the allowable charge electric power for temporarily increasing the charge electric power required of the electric storage apparatus.

According to the second aspect of the present invention, the chargeable electric power can be constant regardless of the relationship between the present current value and the present voltage value. This allows the setting of the constant chargeable electric power regardless of the relationship between the present current value and the present voltage value. Since the reference voltage value is constant as described above, the chargeable electric power is also constant. Since the predetermined internal resistance value is set to be higher than the present internal resistance value, the chargeable electric power calculated from the predetermined internal resistance value can be lower than the chargeable electric power calculated from the present internal resistance value. This achieves the setting of the chargeable electric power in consideration of the deterioration of the electric storage apparatus. The chargeable electric power can be constant until the internal resistance value of the electric storage apparatus reaches (increases to) the predetermined internal resistance value.

The chargeable electric power can be calculated on the basis of the following expression (II):

$$TWin = \frac{(Vb\_now + Ib\_now \times R\_now) - Vb\_high}{R\_old} \times Vb\_high \quad (II)$$

In the expression (II), TWin represents the chargeable electric power. Vb_now represents the voltage value at present, Ib_now represents the current value at present, R_now represents the internal resistance value at present, R_old represents the predetermined internal resistance value, and Vb_high represents the upper limit voltage value.

The internal resistance value at present can be corrected to a value higher than the internal resistance value at present in calculating the internal resistance value at present to calculate the chargeable electric power during discharge of the electric storage apparatus. The chargeable electric power calculated from the corrected internal resistance value is lower than the chargeable electric power calculated from the present (before correction) internal resistance value.

When the present internal resistance value is calculated (estimated), the present internal resistance value may be lower than an actual internal resistance value (true value) due to a calculation error (estimation error). In this case, the chargeable electric power calculated from the present internal resistance value is higher than the chargeable electric power calculated from the actual internal resistance value. This may cause the voltage value to exceed the upper limit voltage value. The correction of the present internal resistance value to reduce the chargeable electric power as described above can prevent the voltage value from exceeding the upper limit voltage value.

The internal resistance value at present can be corrected to a value lower than the internal resistance value at present in calculating the internal resistance value at present to calculate the chargeable electric power during charge of the electric storage apparatus. The chargeable electric power calculated from the corrected internal resistance value is lower than the chargeable electric power calculated from the present (before correction) internal resistance value.

When the present internal resistance value is calculated (estimated), the present internal resistance value may be higher than an actual internal resistance value (true value) due to a calculation error (estimation error). In this case, the chargeable electric power calculated from the present internal resistance value is higher than the chargeable electric power calculated from the actual internal resistance value. This may cause the voltage value to exceed the upper limit voltage value. The correction of the present internal resistance value to reduce the chargeable electric power as described above can prevent the voltage value from exceeding the upper limit voltage value.

Since the predetermined internal resistance value is the predetermined value, the present internal resistance value may be higher than the predetermined internal resistance value depending on the progress of the deterioration of the electric storage apparatus. In this case, the present internal resistance value can be used instead of the predetermined internal resistance value to calculate the chargeable electric power. This can set the chargeable electric power associated with the present internal resistance value when the present internal resistance value is higher than the predetermined internal resistance value.

BRIEF DESCRIPTION OF DRAWINGS

FIG. 1 is a diagram showing the configuration of a battery system.

FIG. 2 is a graph showing a relationship between an allowable discharge electric power, an allowable charge electric power, and an SOC.

FIG. 3 is a graph showing a relationship between an allowable discharge electric power, an allowable charge electric power, and a battery temperature.

FIG. 4 is a flow chart for explaining processing of setting the allowable discharge electric power in Embodiment 1.

FIG. 5 is a graph for explaining a method of calculating an internal resistance value.

FIG. 6 is a graph for explaining a method of calculating a dischargeable electric power.

FIG. 7 is a flow chart for explaining processing of setting the allowable charge electric power in Embodiment 1.

FIG. 8 is a graph for explaining a method of calculating a chargeable electric power.

FIG. 9 is a graph showing a relationship between current values and voltage values when polarization occurs due to discharge or charge.

FIG. 10 is a flow chart for explaining processing of setting an allowable discharge electric power in Embodiment 2.

FIG. 11 is a flow chart for explaining processing of setting an allowable charge electric power in Embodiment 2.

FIG. 12 is a graph for explaining a method of calculating a dischargeable electric power during discharge.

FIG. 13 is a graph for explaining a method of calculating a chargeable electric power during charge.

FIG. 14 is a graph for explaining a method of calculating the chargeable electric power during charge.

FIG. 15 is a graph for explaining a method of calculating the chargeable electric power during discharge.

FIG. 16 is a graph for explaining a method of calculating the dischargeable electric power during discharge.

FIG. 17 is a graph for explaining a method of calculating the dischargeable electric power during charge.

FIG. 18 is a graph for explaining a method of calculating the chargeable electric power during charge.

FIG. 19 is a graph for explaining a method of calculating the chargeable electric power during discharge.

FIG. 20 is a graph for explaining a method of calculating a dischargeable electric power from a present current value and a present voltage value.

DESCRIPTION OF EMBODIMENTS

Preferred embodiments of the present invention will hereinafter be described.

Embodiment 1

FIG. 1 shows the configuration of a battery system (corresponding to an electric storage system in the present invention) in the present embodiment. The battery system of the present embodiment is mounted on a vehicle (so-called hybrid vehicle). The vehicle can run with both an assembled battery and an engine as described later.

The present invention is also applicable to a vehicle (so-called electric vehicle) which can run only with the output from the assembled battery. In addition, the present invention is applicable to any system capable of charging and discharging the assembled battery without being limited to the battery system described in the present embodiment.

An assembled battery (corresponding to an electric storage apparatus in the present invention) 10 has a plurality of cells 11 connected in series. A secondary battery such as a nickel metal hydride battery or a lithium-ion battery can be used as the cell 11. An electric double layer capacitor may be used instead of the secondary battery. The assembled battery 10 may include a plurality of cells 11 connected in parallel.

A voltage sensor 20 detects a voltage value Vb of the assembled battery 10 and outputs the detection result to a controller 30. A temperature sensor 21 detects a temperature (battery temperature) Tb of the assembled battery 10 (cell 11) and outputs the detection result to the controller 30. A current sensor 22 detects a current value Ib of the assembled battery 10 and outputs the detection result to the controller 30. In the present embodiment, the current value Ib during discharge of the assembled battery 10 is set to a positive value, and the current value Ib during charge of the assembled battery 10 is set to a negative value.

The controller 30 has a memory 31. The memory 31 stores various types of information for allowing the controller 30 to perform predetermined processing (especially, processing described in the present embodiment). Although the memory 31 is contained in the controller 30 in the present embodiment, the memory 31 may be provided outside the controller 30.

A positive line PL is connected to a positive electrode terminal of the assembled battery 10, and a negative line NL is connected to a negative electrode terminal of the assembled battery 10. A system main relay SMR-B is provided on the positive electrode line PL. A system main relay SMR-G is provided on the negative electrode line NL. Each of the system main relays SMR-B and SMR-G is switched between ON and OFF in response to a driving signal from the controller 30.

The assembled battery 10 is connected to an inverter 23 through the positive electrode line PL and the negative electrode line NL. The controller 30 turns on the system main relays SMR-B and SMR-G to connect the assemble battery 10 to the inverter 23. This renders the battery system shown in FIG. 1 in a startup state (Ready-On).

When an ignition switch is switched from OFF to ON, the controller 30 turns on the system main relays SMR-B and SMR-G. When the ignition switch is switched from ON to OFF, the controller 30 turns off the system main relays SMR-B and SMR-G. This breaks the connection between the assembled battery 10 and the inverter 23 to render the battery system shown in FIG. 1 in a stopped state (Ready-Off).

The inverter 23 converts a DC power output from the assembled battery 10 into an AC power and outputs the AC power to a motor generator MG2. The motor generator MG2 receives the AC power output from the inverter 23 to generate a kinetic energy (motive power) for running of the vehicle. The kinetic energy generated by the motor generator MG2 is transferred to driving wheels 24 to allow the running of the vehicle.

A power splitting mechanism 25 transfers a motive power of an engine 26 to the driving wheels 24 and to a motor generator MG1. The motor generator MG1 receives the motive power of the engine 26 to generate electric power. The electric power (AC power) generated by the motor generator MG1 is supplied to the motor generator MG2 through the inverter 23 and supplied to the assembled battery 10. When the electric power generated by the motor generator MG1 is supplied to the motor generator MG2, the motor generator MG2 generates a kinetic energy which can drive the driving wheels 24. When the electric power generated by the motor generator MG1 is supplied to the assembled battery 10, the assembled battery 10 can be charged.

For decelerating or stopping the vehicle, the motor generator MG2 converts a kinetic energy generated in braking of the vehicle into an electric energy (AC power). The inverter 23 converts the AC power produced by the motor generator MG2 into a DC power and outputs the DC power to the assembled battery 10. Thus, the assembled battery 10 can store the regenerative power.

In the battery system shown in FIG. 1, a step-up circuit can be provided on the current path between the assembled battery 10 and the inverter 23. The step-up circuit can increase the voltage output from the assembled battery 10 and output the electric power at the increased voltage to the inverter 23. The step-up circuit can also reduce the voltage output from the inverter 23 and output the electric power at the reduced voltage to the assembled battery 10.

For controlling charge and discharge of the assembled battery 10, an allowable discharge electric power Wout and an allowable charge electric power Win are set. The allowable discharge electric power Wout is an upper limit electric power to which the assembled battery 10 can be discharged. Since the current value Ib during discharge is set to a positive value as described above, the allowable discharge electric power Wout has a positive value. The discharge of the assembled battery 10 is controlled such that the discharge electric power of the assembled battery 10 does not exceed the allowable discharge electric power Wout.

The allowable charge electric power Win is an upper limit electric power to which the assembled battery 10 can be charged. Since the current value Ib during charge is set to a negative value as described above, the allowable charge electric power Win has a negative value. The charge of the assembled battery 10 is controlled such that the charge electric power of the assembled battery 10 does not fall below the allowable charge electric power Win.

In setting the allowable discharge electric power Wout, an allowable discharge electric power Wout_ref is used as a reference value. The allowable discharge electric power Wout_ref is set such that the voltage value Vb does not fall below a lower limit voltage value Vb_low even when the discharge is continued for a predetermined time at the allowable discharge electric power Wout_ref. The lower limit voltage value Vb_low is a voltage value Vb set from the viewpoint of preventing overdischarge of the assembled battery 10.

When the allowable discharge electric power Wout_ref is used, the discharge of the assembled battery 10 is controlled such that the discharge electric power of the assembled battery 10 does not exceed the allowable discharge electric power Wout_ref. In other words, the discharge of the assembled battery 10 is limited on the basis of the allowable discharge electric power Wout_ref.

In setting the allowable charge electric power Win, an allowable charge electric power Win_ref is used as a reference value. The allowable charge electric power Win_ref is set such that the voltage value Vb does not exceed an upper limit voltage value Vb_high even when the charge is continued for a predetermined time at the allowable charge electric power Win_ref. The upper limit voltage value Vb_high is a voltage value Vb set from the viewpoint of preventing overcharge of the assembled battery 10.

When the allowable charge electric power Win_ref is used, the charge of the assembled battery 10 is controlled such that the charge electric power of the assembled battery 10 does not fall below the allowable charge electric power Win_ref. In other words, the charge of the assembled battery 10 is limited on the basis of the allowable charge electric power Win_ref.

The allowable discharge electric power Wout_ref and the allowable charge electric power Win_ref are calculated on the basis of at least one of the SOC (State Of Charge) of the assembled battery 10 and the battery temperature Tb. The SOC refers to the proportion of the charge capacity to the full charge capacity.

For calculating the allowable discharge electric power Wout_ref based on the SOC of the assembled battery 10, the relationship between the SOC and the allowable discharge electric power Wout_ref may be previously determined. The relationship can be represented as a map or an expression, and the information identifying the relationship can be stored in the memory 31. Once the SOC of the assembled battery 10 is calculated (estimated), the allowable discharge electric power Wout_ref associated with that SOC can be calculated.

For calculating the allowable charge electric power Win_ref based on the SOC of the assembled battery 10, the relationship between the SOC and the allowable charge electric power Win_ref may be previously determined. The relationship can be represented as a map or an expression, and the information identifying the relationship can be stored in the memory 31. Once the SOC of the assembled battery 10 is calculated (estimated), the allowable charge electric power Win_ref associated with that SOC can be calculated.

For example, the relationship between the SOC and the allowable discharge electric power Wout_ref and the relationship between the SOC and the allowable charge electric power Win_ref can be represented as shown in FIG. 2. In FIG. 2, the vertical axis represents the allowable discharge electric power Wout_ref and the allowable charge electric power Win_ref, and the horizontal axis represents the SOC of the assembled battery 10. The SOC is higher toward the right on the horizontal axis in FIG. 2.

When the SOC of the assembled battery 10 is equal to or higher than a first threshold SOC_th1, the allowable discharge electric power Wout_ref has a fixed value (positive value) regardless of the SOC of the assembled battery 10. When the SOC of the assembled battery 10 is lower than the first threshold SOC_th1, the allowable discharge electric power Wout_ref is lower than the fixed value (positive value). As the SOC is reduced, the allowable discharge electric power Wout_ref is reduced. As the allowable discharge electric power Wout_ref is reduced, the discharge of the assembled battery 10 is limited more. When the allowable discharge electric power Wout_ref is 0 kW, the discharge of the assembled battery 10 is not performed.

When the SOC of the assembled battery 10 is equal to or lower than a second threshold SOC_th2, the allowable charge electric power Win_ref has a fixed value (negative value) regardless of the SOC of the assembled battery 10. The second threshold SOC_th2 is higher than the first threshold SOC_th1. When the SOC of the assembled battery 10 is higher than the second threshold SOC_th2, the allowable charge electric power Win_ref is higher than the fixed value (negative value). As the SOC is increased, the allowable charge electric power Win_ref is increased. In other words, as the SOC is increased, the absolute value of the allowable charge electric power Win_ref is reduced. As the absolute value of the allowable charge electric power Win_ref is reduced, the charge of the assembled battery 10 is limited more. When the allowable charge electric power Win_ref is 0 kW, the charge of the assembled battery 10 is not performed.

For calculating the allowable discharge electric power Wout_ref based on the battery temperature Tb, the relationship between the battery temperature Tb and the allowable discharge electric power Wout_ref may be previously determined. The relationship can be represented as a map or an expression, and the information identifying the relationship can be stored in the memory 31. Once the battery temperature Tb is detected by the temperature sensor 21, the allowable discharge electric power Wout_ref associated with that battery temperature Tb can be calculated.

For calculating the allowable charge electric power Win_ref based on the battery temperature Tb, the relationship between the battery temperature Tb and the allowable charge electric power Win_ref may be previously determined. The relationship can be represented as a map or an expression, and the information identifying the relationship can be stored in the memory 31. Once the battery temperature Tb is detected by the temperature sensor 21, the allowable charge electric power Win_ref associated with that battery temperature Tb can be calculated.

For example, the relationship between the battery temperature Tb and the allowable discharge electric power Wout_ref and the relationship between the battery temperature Tb and the allowable charge electric power Win_ref can be represented as shown in FIG. 3. In FIG. 3, the vertical axis represents the allowable discharge electric power Wout_ref and the allowable charge electric power Win_ref, and the horizontal axis represents the battery temperature Tb. The battery temperature Tb is higher toward the right on the horizontal axis in FIG. 3.

When the battery temperature Tb falls within a range between a first threshold Tb_th1 and a second threshold Tb_th2, the allowable discharge electric power Wout_ref has a fixed value (positive value) regardless of the battery temperature Tb. The first threshold Tb_th1 is higher than the second threshold Tb_th2.

When the battery temperature Tb is higher than the first threshold Tb_th1, the allowable discharge electric power Wout_ref is lower than the fixed value (positive value). As the battery temperature Tb is increased, the allowable discharge electric power Wout_ref is reduced. When the battery temperature Tb is lower than the second threshold Tb_th2, the allowable discharge electric power Wout_ref is lower than the fixed value (positive value). As the battery temperature Tb is reduced, the allowable discharge electric power Wout_ref is reduced.

When the battery temperature Tb falls within the range between the first threshold Tb_th1 and the second threshold Tb_th2, the allowable charge electric power Win_ref has a fixed value (negative value) regardless of the battery temperature Tb. When the battery temperature Tb is higher than the first threshold Tb_th1, the allowable charge electric power Win_ref is higher than the fixed value (negative value). As the battery temperature Tb is increased, the allowable charge electric power Win_ref is increased. In other words, as the battery temperature Tb is increased, the absolute value of the allowable charge electric power Win_ref is reduced.

When the battery temperature Tb is lower than the second threshold Tb_th2, the allowable charge electric power Win_ref is higher than the fixed value (negative value). As the battery temperature Tb is reduced, the allowable charge electric power Win_ref is increased. In other words, as the battery temperature Tb is reduced, the absolute value of the allowable charge electric power Win_ref is reduced.

In the example shown by FIG. 3, the battery temperatures Tb (the first threshold Tb_th1 and the second threshold Tb_th2) used to reduce the allowable discharge electric power Wout_ref are equal to the battery temperatures Tb (the first threshold Tb_th1 and the second threshold Tb_th2) used to reduce the absolute value of the allowable charge electric power Win_ref. However, the present invention is not limited thereto. Specifically, for at least one of the first threshold Tb_th1 and the second threshold Tb_th2, the battery temperature Tb used to reduce the allowable discharge electric power Wout_ref may be different from the battery temperature Tb used to reduce the absolute value of the allowable charge electric power Win_ref.

In the example shown by FIG. 3, the battery temperatures Tb when the allowable discharge electric power Wout_ref is 0 kW are equal to the battery temperatures Tb when the allowable charge electric power Win_ref is 0 kW. However, they may be different from each other.

For calculating the allowable discharge electric power Wout_ref based on the SOC of the assembled battery 10 and the battery temperature Tb, the relationship between the SOC, the battery temperature Tb, and the allowable discharge electric power Wout_ref may be previously determined. For calculating the allowable charge electric power Win_ref based on the SOC of the assembled battery 10 and the battery temperature Tb, the relationship between the SOC, the battery temperature Tb, and the allowable charge electric power Win_ref may be previously determined.

The discharge of the assembled battery 10 is limited on the basis of the allowable discharge electric power Wout_ref described above. For temporarily relaxing the limitation on discharge, a dischargeable electric power TWout is calculated. The charge of the assembled battery 10 is limited on the basis of the allowable charge electric power Win_ref described above. For temporarily relaxing the limitation on charge, a chargeable electric power TWin is calculated. A method of calculating the dischargeable electric power TWout and the chargeable electric power TWin is described later.

Next, description is made of processing of setting the allowable discharge electric power Wout with reference to a flow chart in FIG. 4. The processing shown in FIG. 4 is performed by the controller 30.

At step S101, the controller 30 detects the voltage value Vb, the current value Ib, and the battery temperature Tb of the assembled battery 10. The voltage value Vb is detected by the voltage sensor 20. The current value Ib is detected by the current sensor 22. The battery temperature Tb is detected by the temperature sensor 21.

At step S102, the controller 30 calculates (estimates) the SOC of the assembled battery 10. The calculation of the SOC can be performed with a known method as appropriate. For example, the SOC can be calculated by summing the current values Ib. While charge and discharge of the assembled battery 10 are stopped, the OCV of the assembled battery 10 can be measured. Since the OCV and the SOC have a predetermined relationship, the relationship can be previously determined to calculate the SOC associated with the measured OCV. The present SOC can be calculated on the basis of the calculated SOC and the sum of the current values Ib.

At step S103, the controller 30 calculates a present internal resistance value R_now of the assembled battery 10. As is well known, the internal resistance value R_now can be calculated on the basis of the voltage value Vb and the current value Ib.

For example, the voltage value Vb and the current value Ib are continuously detected during charge and discharge of the assembled battery 10, and the relationship between the voltage value Vb and the current value Ib is plotted in a coordinate system in which the respective coordinate axes represent the voltage value Vb and the current value Ib. FIG. 5 shows the coordinate system in which the voltage value Vb and the current value Ib are shown by the respective coordinate axes. A plurality of relationships between the voltage value Vb and the current value Ib are plotted in FIG. 5. As shown in FIG. 5, a straight line L_now approximating the plurality of the plotted relationships is calculated, and the slope of the straight line L_now corresponds to the internal resistance value R_now. Since the internal resistance value R_now depends on the battery temperature Tb and the SOC of the assembled battery 10, the internal resistance value R_now can be calculated for each of the battery temperatures Tb and the SOCs.

At step S104, the controller 30 calculates the allowable discharge electric power Wout_ref. As described above, the allowable discharge electric power Wout_ref can be calculated on the basis of at least one of the SOC of the assembled battery 10 and the battery temperature Tb.

At step S105, the controller 30 determines whether or not a request to relax the discharge limitation is present. The discharge limitation refers to discharge limitation based on the allowable discharge electric power Wout_ref. Whether or not the request to relax the discharge limitation is present is determined on the basis of a discharge electric power required of the assembled battery 10. When the discharge electric power of the assembled battery 10 needs to be increased temporarily, the controller 30 determines that the request to relax the discharge limitation is present. By way of example, for starting the engine 26, or for increasing the discharge electric power from the assembled battery 10 to the motor generator MG2 in response to pressing of an accelerator pedal, the discharge electric power of the assembled battery 10 needs to be increased temporarily.

When the request to relax the discharge limitation is absent, the controller 30 sets the allowable discharge electric power Wout at step S106. Specifically, the controller 30 sets the allowable discharge electric power Wout_ref calculated in the processing at step S104 as the allowable discharge electric power Wout.

When the request to relax the discharge limitation is present, the controller 30 calculates the dischargeable electric power TWout at step S107. The dischargeable electric power TWout is an electric power found when the voltage value Vb of the assembled battery 10 is reduced to the lower limit voltage value Vb_low due to the discharge resulting from the relaxed discharge limitation. The dischargeable electric power TWout can be used to prevent the voltage value Vb from falling below the lower limit voltage value Vb_low.

In the present embodiment, the dischargeable electric power TWout is calculated by taking account of an internal resistance value (a predetermined constant) R_old of the deteriorated assembled battery 10. The internal resistance value R_old corresponds to a predetermined internal resistance value in the present invention. The method of calculating the dischargeable electric power TWout is described later. At step S108, the controller 30 sets the dischargeable electric power TWout calculated in the processing at step S107 as the allowable discharge electric power Wout. Alternatively, the allowable discharge electric power Wout may be set at an electric power lower than the dischargeable electric power TWout to allow for a margin.

Next, description is made of the method of calculating the dischargeable electric power TWout. The dischargeable electric power TWout is calculated on the basis of the following expression (1).

$$TWout = \frac{(Vb\_now + Ib\_now \times R\_now) - Vb\_low}{R\_old} \times Vb\_low \quad (1)$$

In the expression (1), Vb_now represents the present voltage value Vb of the assembled battery 10, and Ib_now represents the present current value Ib of the assembled battery 10. R_now represents the present internal resistance value of the assembled battery 10, and the value calculated in the processing at step 103 shown in FIG. 4 is used as R_now. Vb_low represents the lower limit voltage value.

R_old represents the internal resistance value (predetermined constant) of the assembled battery 10 after deterioration. Specifically, the internal resistance value of the assembled battery 10 after the elapse of a predetermined time is assumed and serves as the internal resistance value R_old. The predetermined time can be set, for example at a target time for which the assembled battery 10 can be continuously used. The internal resistance value R_old is set to be higher than the internal resistance value R_now. In the calculation of the dischargeable electric power TWout based on the expression (1), the internal resistance values R_old and R_now at the same battery temperature Tb and the same SOC of the assembled battery 10 can be used.

According to the expression (1), an electric power corresponding to a point A1 shown in FIG. 6 represents the dischargeable electric power TWout. Specifically, the dischargeable electric power TWout is a value calculated by multiplying the lower limit voltage value Vb_low by a current value Ib_max at the point A1.

In FIG. 6, a point A2 shows the relationship between the present current value Ib_now and the present voltage value Vb_now. A point A3 is calculated on the basis of the point A2 and the present internal resistance value R_now. The point A3 indicates a point at which the current value Ib is 0 A on a straight line L_now passing through the point A2. Thus, the point A3 represents the OCV (OCV_now, corresponding to a reference voltage value in the present invention) of the assembled battery 10.

The point A1 is calculated on the basis of the point A3 and the internal resistance value R_old after deterioration. The point A1 indicates a point at which the voltage value Vb is the lower limit voltage value Vb_low on a straight line L_old passing through the point A3. The slope of the straight line L_old represents the internal resistance value R_old. At the point A1, the voltage value Vb is the lower limit voltage value Vb_low and the current value Ib is the current value Ib_max.

The present current value Ib and the present voltage value Vb of the assembled battery 10 are located on the straight line L_now. In the calculation of the dischargeable electric power (electric power at the point A1) TWout as described above, the dischargeable electric power TWout is constant (that is, the electric power at the point A1) when the current value Ib_now and the voltage value Vb_now are located at any point on the straight lint L_now. Thus, the dischargeable electric power TWout can be constant regardless of the relationship between the current value Ib_now and the voltage value Vb_now.

The assembled battery 10 is deteriorated due to the elapse of time or the like, and the internal resistance value of the assembled battery 10 is increased. In the present embodiment, the dischargeable electric power TWout is set by using the internal resistance value R_old after the deterioration instead of the present internal resistance value R_now. This can provide the constant dischargeable electric power TWout until the internal resistance value of the assembled battery 10 reaches the internal resistance value R_old from the internal resistance value before deterioration (in a so-called initial state). The initial state refers to a state in which the assembled battery 10 is new immediately after the manufacture.

Although the dischargeable electric power (electric power at the point A1) TWout is calculated during discharge of the assembled battery 10 in FIG. 6, the present invention is not limited thereto. The dischargeable electric power TWout can be calculated during charge of the assembled battery 10. In this case, the dischargeable electric power TWout can be calculated in the same manner as that described in FIG. 6.

Next, description is made of processing of setting the allowable charge electric power Win with reference to a flow chart in FIG. 7. The processing shown in FIG. 7 is performed by the controller 30.

At step S201, the controller 30 detects the voltage value Vb, the current value Ib, and the battery temperature Tb of the assembled battery 10. The processing at step S201 is identical to the processing at step S101 shown in FIG. 4. At step S202, the controller 30 calculates (estimates) the SOC of the assembled battery 10. The processing at step S202 is identical to the processing at step S102 shown in FIG. 4.

At step S203, the controller 30 calculates the internal resistance value R_now of the assembled battery 10. The processing at step S203 is identical to the processing at step S103 shown in FIG. 4. At step S204, the controller 30 calculates the allowable charge electric power Win_ref. As described above, the allowable charge electric power Win_ref can be calculated on the basis of at least one of the SOC of the assembled battery 10 and the battery temperature Tb.

At step S205, the controller 30 determines whether or not a request to relax the charge limitation is present. The charge limitation refers to charge limitation based on the allowable charge electric power Win_ref. Whether or not the request to relax the charge limitation is present is determined on the basis of a charge electric power required of the assembled battery 10. When the charge electric power of the assembled battery 10 needs to be increased temporarily, the controller 30 determines that the request to relax the charge limitation is present.

For example, when a brake pedal is pressed to increase the level (absolute value) of regenerative torque required of the motor generator MG2 to a predetermined value or higher, the electric power from the power generation by the motor generator MG2 needs to be increased. In this case, the charge electric power of the assembled battery 10 needs to be increased temporarily.

When the request to relax the charge limitation is absent, the controller 30 sets the allowable charge electric power Win at step S206. Specifically, the controller 30 sets the allowable charge electric power Win_ref calculated in the processing at step S204 as the allowable charge electric power Win.

When the request to relax the charge limitation is present, the controller 30 calculates the chargeable electric power TWin at step S207. The chargeable electric power TWin is an electric power found when the voltage value Vb of the assembled battery 10 is increased to the upper limit voltage value Vb_high due to the charge resulting from the relaxed charge limitation. The chargeable electric power TWin can be used to prevent the voltage value Vb from exceeding the upper limit voltage value Vb_high.

In the present embodiment, the chargeable electric power TWin is calculated by taking account of an internal resistance value of the deteriorated assembled battery 10. The method of calculating the chargeable electric power TWin is described later. At step S208, the controller 30 sets the chargeable electric power TWin calculated in the processing at step S207 as the allowable charge electric power Win.

Next, description is made of the method of calculating the chargeable electric power TWin. The chargeable electric power TWin is calculated on the basis of the following expression (2).

$$TWin = \frac{(Vb\_now + Ib\_now \times R\_now) - Vb\_high}{R\_old} \times Vb\_high \quad (2)$$

In the expression (2), Vb_now represents the present voltage value Vb of the assembled battery 10, and Ib_now represents the present current value Ib of the assembled battery 10. R_now represents the present internal resistance value of the assembled battery 10, and the value calculated in the processing at step 203 shown in FIG. 7 is used as R_now. Vb_high represents the upper limit voltage value.

R_old represents the internal resistance value (predetermined constant) of the assembled battery 10 after deterioration. Specifically, the internal resistance value of the assembled battery 10 after the elapse of a predetermined time is assumed and serves as the internal resistance value R_old. The predetermined time can be set, for example at a target time for which the assembled battery 10 can be continuously used. The internal resistance value R_old is set to be higher than the internal resistance value R_now. In the calculation of the chargeable electric power TWin based on the expression (2), the internal resistance values R_old and R_now at the same battery temperature Tb and the same SOC of the assembled battery 10 can be used.

According to the expression (2), an electric power corresponding to a point B1 shown in FIG. 8 represents the chargeable electric power TWin. Specifically, the chargeable electric power TWin is a value calculated by multiplying the upper limit voltage value Vb_high by a current value Ib_min at the point B1.

In FIG. 8, a point B2 shows the relationship between the present current value Ib_now and the present voltage value Vb_now. A point B3 is calculated on the basis of the point B2 and the present internal resistance value R_now. The point B3 indicates a point at which the current value Ib is 0 A on a straight line L_now passing through the point B2. Thus, the point B3 represents the OCV (OCV_now, corresponding to the reference voltage value in the present invention) of the assembled battery 10.

The point B1 is calculated on the basis of the point B3 and the internal resistance value R_old after deterioration. The point B indicates a point at which the voltage value Vb is the upper limit voltage value Vb_high on a straight line L_old passing through the point B3. The slope of the straight line L_old represents the internal resistance value R_old. At the point B1, the voltage value Vb is the upper limit voltage value Vb_high and the current value Ib is the current value Ib_min.

The present current value Ib and the present voltage value Vb of the assembled battery 10 are located on the straight line L_now. In the calculation of the chargeable electric power (electric power at the point B1) TWin as described above, the chargeable electric power TWin is constant (that is, the electric power at the point B1) when the current value Ib_now and the voltage value Vb_now are located at any point on the straight lint L_now. Thus, the chargeable electric power TWin can be constant regardless of the relationship between the current value Ib_now and the voltage value Vb_now.

In the present embodiment, the chargeable electric power TWin is set by using the internal resistance value R_old after the deterioration instead of the present internal resistance value R_now. This can provide the constant chargeable electric power TWin until the internal resistance value of the assembled battery 10 reaches the internal resistance value R_old from the internal resistance value before deterioration (in the so-called initial state).

Although the chargeable electric power (electric power at the point B1) TWin is calculated during charge of the assembled battery 10 in FIG. 8, the present invention is not limited thereto. The chargeable electric power TWin can be calculated during discharge of the assembled battery 10. In this case, the chargeable electric power TWin can be calculated in the same manner as that described in FIG. 8.

Polarization may occur due to discharge or charge of the assemble battery 10. The voltage value Vb when the polarization occurs due to discharge is lower than the voltage value Vb when no polarization occurs, and the difference between the voltage values Vb corresponds to a voltage change amount $\Delta V\_dyn1$ resulting from the polarization during discharge. The voltage value Vb when the polarization occurs due to charge is higher than the voltage value Vb when no polarization occurs, and the difference between the voltage values Vb corresponds to a voltage change amount $\Delta V\_dyn2$ resulting from the polarization during charge.

In FIG. 9, a straight line L1 represents the relationship between the current value Ib and the voltage value Vb in the assembled battery 10 in which no polarization occurs. A straight line L2 represents the relationship between the current value Ib and the voltage value Vb in the assembled battery 10 in which polarization occurs due to discharge. A straight line L3 represents the relationship between the current value Ib and the voltage value Vb in the assembled battery 10 in which polarization occurs due to charge. The straight lines L2 and L3 show the equal polarization state.

Since the present internal resistance value R_now of the assembled battery 10 does not vary, the straight lines L1, L2, and L3 have the same slope. The interval between the straight lines L1 and L2 (voltage difference at the same current value Ib) corresponds to the voltage change amount $\Delta V\_dyn1$.
The interval between the straight lines L1 and L3 (voltage difference at the same current value Ib) corresponds to the voltage change amount
$\Delta V\_dyn2$.

The present invention is applicable to the assembled battery 10 in which the polarization occurs due to discharge or charge. When the polarization occurs due to discharge, the straight line L2 shown in FIG. 9 corresponds to the straight line L_now shown in FIGS. 6 and 8. On the straight line L2, the voltage value Vb at the current value Ib of 0 A corresponds to the point A3 shown in FIG. 6 or the point B3 shown in FIG. 8 and serves as the reference voltage value in the present invention.

When the polarization occurs due to charge, the straight line L3 shown in FIG. 9 corresponds to the straight line L_now shown in FIGS. 6 and 8. On the straight line L3, the voltage value Vb at the current value Ib of 0 A corresponds to the point A3 shown in FIG. 6 or the point B3 shown in FIG. 8 and serves as the reference voltage value in the present invention. As a result, when the polarization occurs due to discharge or charge, the dischargeable electric power TWout and the chargeable electric power TWin can be calculated as in the present embodiment.

For setting the allowable discharge electric power Wout and the allowable charge electric power Win, at least one of the processing operations shown in FIG. 4 and FIG. 7 can be performed.

Embodiment 2

Embodiment 2 of the present invention will hereinafter be described. In the present embodiment, components identical to those described in Embodiment 1 are designated with the same reference numerals, and detailed description thereof is omitted. The following description is mainly focused on differences from Embodiment 1.

Deterioration of the assembled battery 10 may proceed to increase the internal resistance value R_now to a level higher than the internal resistance value R_old. For example, when the time for which the assembled battery 10 is continuously used exceeds the predetermine time (target time) described in the expression (1) and the expression (2), the internal resistance value R_now may be higher than the internal resistance value R_old. In the present embodiment, an allowable discharge electric power Wout and an allowable charge electric power Win are set in view of such a situation.

FIG. 10 is a flow chart showing processing of setting the allowable discharge electric power Wout in the present embodiment. The processing shown in FIG. 10 corresponds to the processing shown in FIG. 4. The same steps as those shown in FIG. 4 are designated with the same reference numerals, and detailed description is omitted. The following description is mainly focused on differences from the processing shown in FIG. 4.

When the request to relax discharge limitation is present at step S105, the controller 30 determines whether or not the internal resistance value R_now is higher than the internal resistance value R_old at step S109. The internal resistance value R_now is a value calculated in processing at step S103. The internal resistance value R_old is the value described in the expression (1). The internal resistance values R_old and R_now at the same battery temperature Tb and the same SOC of the assembled battery 10 can be used.

When the internal resistance value R_now is higher than the internal resistance value R_old, the controller 30 performs processing at step S110. When the internal resistance value R_now is equal to or lower than the internal resistance value R_old, the controller 30 performs processing at step S107. At step S110, the controller 30 calculates a dischargeable electric power TWout based on the expression (1). The internal resistance value R_now is used instead of the internal resistance value R_old shown in the expression (1).

FIG. 11 is a flow chart showing processing of setting the allowable charge electric power Win in the present embodiment. The processing shown in FIG. 11 corresponds to the processing shown in FIG. 7. The same steps as those shown in FIG. 7 are designated with the same reference numerals, and detailed description is omitted. The following description is mainly focused on differences from the processing shown in FIG. 7.

When the request to relax charge limitation is present at step S205, the controller 30 determines whether or not the internal resistance value R_now is higher than the internal resistance value R_old at step S209. The internal resistance value R_now is a value calculated in processing at step S203. The internal resistance value R_old is the value described in the expression (2). The internal resistance values R_old and R_now at the same battery temperature Tb and the same SOC of the assembled battery 10 can be used.

When the internal resistance value R_now is higher than the internal resistance value R_old, the controller 30 performs processing at step S210. When the internal resistance value R_now is equal to or lower than the internal resistance value R_old, the controller 30 performs processing at step S207. At step S210, the controller 30 calculates a chargeable electric power TWin based on the expression (2). The internal resistance value R_now is used instead of the internal resistance value R_old shown in the expression (2).

According to the present embodiment, when the internal resistance value R_now is higher than the internal resistance value R_old, the dischargeable electric power TWout and the chargeable electric power TWin are calculated on the basis of the internal resistance value R_now. For relaxing the discharge limitation, the dischargeable electric power TWout associated with the internal resistance value R_now can be set as the allowable discharge electric power Wout. For relaxing the charge limitation, the chargeable electric power TWin associated with the internal resistance value R_now can be set as the allowable charge electric power Win.

Embodiment 3

Embodiment 3 of the present invention will hereinafter be described. In the present embodiment, components identical to those described in Embodiment 1 are designated with the same reference numerals, and detailed description thereof is omitted. The following description is mainly focused on differences from Embodiments 1 and 2. The present embodiment is applicable to each of Embodiments 1 and 2.

An internal resistance value R_now calculated as described in Embodiment 1 may deviate from an actual internal resistance value (true value) R_real. The dischargeable electric power TWout calculated from the expression (1) and the chargeable electric power TWin calculated from the expression (2) deviate accordingly.

First, description is made of the case where the internal resistance value R_now is lower than the internal resistance value R_real.

A point C1 shown in FIG. 12 represents the relationship between the present current value Ib_now and the present voltage value Vb_now during discharge of an assembled battery 10. The slope of a straight line L_real represents the internal resistance value R_real. As described in Embodiment 1, when the dischargeable electric power TWout is calculated on the basis of the internal resistance value R_now, an electric power corresponding to a point C2 indicates the dischargeable electric power TWout.

When the dischargeable electric power TWout is calculated on the basis of the internal resistance value R_real, an electric power corresponding to a point C3 indicates the dischargeable electric power TWout. The dischargeable electric power TWout at the point C2 is lower than the dischargeable electric power TWout at the point C3. Thus, the dischargeable electric power TWout calculated from the internal resistance value R_now is an underestimate of the dischargeable electric power TWout calculated from the internal resistance value R_real.

A point D1 shown in FIG. 13 represents the relationship between the present current value Ib_now and the present voltage value Vb_now during charge of the assembled battery 10. The slope of a straight line L_real represents the internal resistance value R_real. As described in Embodiment 1, when the dischargeable electric power TWout is calculated on the basis of the internal resistance value R_now, an electric power corresponding to a point D2 indicates the dischargeable electric power TWout.

When the dischargeable electric power TWout is calculated on the basis of the internal resistance value R_real, an electric power corresponding to a point D3 indicates the dischargeable electric power TWout. The dischargeable electric power TWout at the point D2 is higher than the dischargeable electric power TWout at the point D3. Thus, the dischargeable electric power TWout calculated from the internal resistance value R_now is an overestimate of the dischargeable electric power TWout calculated from the internal resistance value R_real.

A point E1 shown in FIG. 14 represents the relationship between the present current value Ib_now and the present voltage value Vb_now during charge of the assembled battery 10. The slope of a straight line L_real represents the internal resistance value R_real. As described in Embodiment 1, when the chargeable electric power TWin is calculated on the basis of the internal resistance value R_now, an electric power corresponding to a point E2 indicates the chargeable electric power TWin.

When the chargeable electric power TWin is calculated on the basis of the internal resistance value R_real, an electric power corresponding to a point E3 indicates the chargeable electric power TWin. The chargeable electric power (absolute value) TWin at the point E2 is lower than the chargeable electric power (absolute value) TWin at the point E3. Thus, the chargeable electric power TWin calculated from the internal resistance value R_now is an underestimate of the chargeable electric power TWin calculated from the internal resistance value R_real.

A point F1 shown in FIG. 15 represents the relationship between the present current value Ib_now and the present voltage value Vb_now during discharge of the assembled battery 10. The slope of a straight line L_real represents the internal resistance value R_real. As described in Embodiment 1, when the chargeable electric power TWin is calculated on the basis of the internal resistance value R_now, an electric power corresponding to a point F2 indicates the chargeable electric power TWin.

When the chargeable electric power TWin is calculated on the basis of the internal resistance value R_real, an electric power corresponding to a point F3 indicates the chargeable electric power TWin. The chargeable electric power (absolute value) TWin at the point F2 is higher than the chargeable electric power (absolute value) TWin at the point F3. Thus, the chargeable electric power TWin calculated from the internal resistance value R_now is an overestimate of the chargeable electric power TWin calculated from the internal resistance value R_real.

Next, description is made of the case where the internal resistance value R_now is higher than the internal resistance value R_real.

A point G1 shown in FIG. 16 represents the relationship between the present current value Ib_now and the present voltage value Vb_now during discharge of the assembled battery 10. The slope of a straight line L_real represents the internal resistance value R_real. As described in Embodiment 1, when the dischargeable electric power TWout is calculated on the basis of the internal resistance value R_now, an electric power corresponding to a point G2 indicates the dischargeable electric power TWout.

When the dischargeable electric power TWout is calculated on the basis of the internal resistance value R_real, an electric power corresponding to a point G3 indicates the dischargeable electric power TWout. The dischargeable electric power TWout at the point G2 is higher than the dischargeable electric power TWout at the point G3. Thus, the dischargeable electric power TWout calculated from the internal resistance value R_now is an overestimate of the dischargeable electric power TWout calculated from the internal resistance value R_real.

A point H1 shown in FIG. 17 represents the relationship between the present current value Ib_now and the present voltage value Vb_now during charge of the assembled battery 10. The slope of a straight line L_real represents the internal resistance value R_real. As described in Embodiment 1, when the dischargeable electric power TWout is calculated on the basis of the internal resistance value R_now, an electric power corresponding to a point H2 indicates the dischargeable electric power TWout.

When the dischargeable electric power TWout is calculated on the basis of the internal resistance value R_real, an electric power corresponding to a point H3 indicates the dischargeable electric power TWout. The dischargeable electric power TWout at the point H2 is lower than the dischargeable electric power TWout at the point H3. Thus, the dischargeable electric power TWout calculated from the internal resistance value R_now is an underestimate of the dischargeable electric power TWout calculated from the internal resistance value R_real.

A point I1 shown in FIG. 18 represents the relationship between the present current value Ib_now and the present voltage value Vb_now during charge of the assembled battery 10. The slope of a straight line L_real represents the internal resistance value R_real. As described in Embodiment 1, when the chargeable electric power TWin is calculated on the basis of the internal resistance value R_now, an electric power corresponding to a point I2 indicates the chargeable electric power TWin.

When the chargeable electric power TWin is calculated on the basis of the internal resistance value R_real, an electric power corresponding to a point I3 indicates the chargeable electric power TWin. The chargeable electric power (absolute value) TWin at the point I2 is higher than the chargeable electric power (absolute value) TWin at the point I3. Thus, the chargeable electric power TWin calculated from the internal resistance value R_now is an overestimate of the chargeable electric power TWin calculated from the internal resistance value R_real.

A point J1 shown in FIG. 19 represents the relationship between the present current value Ib_now and the present voltage value Vb_now during discharge of the assembled battery 10. The slope of a straight line L_real represents the internal resistance value R_real. As described in Embodiment 1, when the chargeable electric power TWin is calculated on the basis of the internal resistance value R_now, an electric power corresponding to a point J2 indicates the chargeable electric power TWin.

When the chargeable electric power TWin is calculated on the basis of the internal resistance value R_real, an electric power corresponding to a point J3 indicates the chargeable electric power TWin. The chargeable electric power (absolute value) TWin at the point J2 is lower than the chargeable electric power (absolute value) TWin at the point J3. Thus, the chargeable electric power TWin calculated from the internal resistance value R_now is an underestimate of the chargeable electric power TWin calculated from the internal resistance value R_real.

Table 1 shows the summary of the description made with reference to FIG. 12 to FIG. 19.

TABLE 1

|  |  | TWout | TWin |
|---|---|---|---|
| R_now < R_real | during discharge | underestimate (FIG. 12) | overestimate (FIG. 15) |
|  | during charge | overestimate (FIG. 13) | underestimate (FIG. 14) |
| R_now > R_real | during discharge | overestimate (FIG. 16) | underestimate (FIG. 19) |
|  | during charge | underestimate (FIG. 17) | overestimate (FIG. 18) |

When the dischargeable electric power TWout is overestimated, the voltage value Vb may fall below the lower limit voltage value Vb_low. When the chargeable electric power TWin is overestimated, the voltage value Vb may exceed the upper limit voltage value Vb_high. To prevent those situations, the expressions for calculating the dischargeable electric power TWout and the chargeable electric power TWin are changed in the present embodiment.

For calculating the dischargeable electric power TWout during discharge of the assembled battery 10, the following expression (3) can be used.

$$TWout = \frac{(Vb\_now + Ib\_now \times R\_now \times k1) - Vb\_low}{R\_old} \times Vb\_low \quad (3)$$

$$k1 < 1$$

In the expression (3), the internal resistance value R_now is multiplied by a correction coefficient k1 to correct the internal resistance value R_now. The correction coefficient k1 is a value less than one and can be set as appropriate. Since the correction coefficient k1 is the value less than one, the value (the corrected internal resistance value) calculated by multiplying the internal resistance value R_now by the correction coefficient k1 is less than the internal resistance value R_now.

As a result, the dischargeable electric power TWout calculated from the corrected internal resistance value is lower than the dischargeable electric power TWout calculated from the internal resistance value R_now. Thus, the dischargeable electric power TWout calculated in the expression (3) is an electric power corresponding to a point shifted to a lower current value Ib from the point G2 shown in FIG. 16. This can prevent the overestimation of dischargeable electric power TWout as described above.

As seen in Table 1, when the internal resistance value R_now is higher than the internal resistance value R_real and the assembled battery 10 is discharged, the dischargeable electric power TWout is overestimated. Since the relative levels of the internal resistance values R_now and R_real are not determined, it is only required that the dischargeable electric power TWout should be calculated on the basis of the expression (3) during discharge of the assembled battery 10 in order to prevent the overestimation of the dischargeable electric power TWout.

For calculating the dischargeable electric power TWout during charge of the assembled battery 10, the following expression (4) can be used.

$$TWout = \frac{(Vb\_now + Ib\_now \times R\_now \times k2) - Vb\_low}{R\_old} \times Vb\_low \quad (4)$$

$$k2 > 1$$

In the expression (4), the internal resistance value R_now is multiplied by a correction coefficient k2 to correct the internal resistance value R_now. The correction coefficient k2 is a value larger than one and can be set as appropriate. Since the correction coefficient k2 is the value larger than one, a value (the corrected internal resistance value) calculated by multiplying the internal resistance value R_now by the correction coefficient k2 is higher than the internal resistance value R_now.

As a result, the dischargeable electric power TWout calculated from the corrected internal resistance value is lower than the dischargeable electric power TWout calculated from the internal resistance value R_now. Thus, the dischargeable electric power TWout calculated in the expression (4) is an electric power corresponding to a point shifted to a lower current value Ib from the point D2 shown in FIG. 13. This can prevent the overestimation of the dischargeable electric power TWout as described above.

As seen in Table 1, when the internal resistance value R_now is lower than the internal resistance value R_real and the assembled battery 10 is charged, the dischargeable electric power TWout is overestimated. Since the relative levels of the internal resistance values R_now and R_real are not determined, it is only required that the dischargeable electric power TWout should be calculated on the basis of the expression (4) during charge of the assembled battery 10 in order to prevent the overestimation of the dischargeable electric power TWout.

For calculating the chargeable electric power TWin during discharge of the assembled battery 10, the following expression (5) can be used.

$$TWin = \frac{(Vb\_now + Ib\_now \times R\_now \times k3) - Vb\_high}{R\_old} \times Vb\_high \quad (5)$$

$$k3 > 1$$

In the expression (5), the internal resistance value R_now is multiplied by a correction coefficient k3 to correct the internal resistance value R_now. The correction coefficient k3 is a value larger than one and can be set as appropriate. Since the correction coefficient k3 is the value larger than one, a value (the corrected internal resistance value) calculated by multiplying the internal resistance value R_now by the correction coefficient k3 is higher than the internal resistance value R_now.

As a result, the chargeable electric power (absolute value) TWin calculated from the corrected internal resistance value is lower than the chargeable electric power (absolute value) TWin calculated from the internal resistance value R_now. Thus, the chargeable electric power TWin calculated in the expression (5) is an electric power corresponding to a point shifted to a higher current value Ib from the point F2 shown in FIG. 15. This can prevent the overestimation of the chargeable electric power (absolute value) TWin as described above.

As seen in Table 1, when the internal resistance value R_now is lower than the internal resistance value R_real and the assembled battery 10 is discharged, the chargeable electric power TWin is overestimated. Since the relative levels of the internal resistance values R_now and R_real are not determined, it is only required that the chargeable electric power TWin should be calculated on the basis of the expression (5) during discharge of the assembled battery 10 in order to prevent the overestimation of the chargeable electric power TWin.

For calculating the chargeable electric power TWin during charge of the assembled battery 10, the following expression (6) can be used.

$$TWin = \frac{(Vb\_now + Ib\_now \times R\_now \times k4) - Vb\_high}{R\_old} \times Vb\_high \quad (6)$$

$$k4 < 1$$

In the expression (6), the internal resistance value R_now is multiplied by a correction coefficient k4 to correct the internal resistance value R_now. The correction coefficient k4 is a value less than one and can be set as appropriate. Since the correction coefficient k4 is the value less than one, a value (the corrected internal resistance value) calculated by multiplying the internal resistance value R_now by the correction coefficient k4 is lower than the internal resistance value R_now.

As a result, the chargeable electric power (absolute value) TWin calculated from the corrected internal resistance value is lower than the chargeable electric power (absolute value) TWin calculated from the internal resistance value R_now. Thus, the chargeable electric power TWin calculated in the expression (6) is an electric power corresponding to a point shifted to a higher current value Ib from the point I2 shown in FIG. 18. This can prevent the overestimation of the chargeable electric power TWin as described above.

As seen in Table 1, when the internal resistance value R_now is higher than the internal resistance value R_real and the assembled battery 10 is charged, the chargeable electric power TWin is overestimated. Since the relative levels of the internal resistance values R_now and R_real are not determined, it is only required that the chargeable electric power TWin should be calculated on the basis of the expression (6) during charge of the assembled battery 10 in order to prevent the overestimation of the chargeable electric power TWin.

The invention claimed is:

1. An electric storage system comprising:
a voltage sensor detecting a voltage value of an electric storage apparatus;
a current sensor detecting a current value of the electric storage apparatus; and
a controller setting an allowable discharge electric power serving as an upper limit electric power to which discharge of the electric storage apparatus is allowed,
wherein the controller uses the detected voltage value, the detected current value, and a present internal resistance value of the electric storage apparatus that is calculated based on the detected voltage value and the detected current value, to calculate a reference voltage value, the reference voltage value being the voltage value when no current flows,
the controller uses the reference voltage value and a predetermined internal resistance value to calculate a dischargeable electric power, the predetermined internal resistance value being previously set to be higher than the present internal resistance value, the dischargeable electric power being an electric power when a discharge electric power of the electric storage apparatus is increased to cause the voltage value to reach a lower limit voltage value, and
the controller sets the dischargeable electric power as the allowable discharge electric power when temporarily increasing the discharge electric power required of the electric storage apparatus.

2. The electric storage system according to claim 1, wherein the controller calculates the dischargeable electric power based on the following expression (I):

$$TWout = \frac{(Vb\_now + Ib\_now \times R\_now) - Vb\_low}{R\_old} \times Vb\_low \quad (I)$$

where, in the expression (I), TWout represents the dischargeable electric power, Vb_now represents the detected voltage value, Ib_now represents the detected current value, R_now represents the present internal resistance value, Vb_low represents the lower limit voltage value, and R_old represents the predetermined internal resistance value.

3. The electric storage system according to claim 1, wherein the controller corrects the present internal resistance value to a value lower than the present internal resistance value at present in calculating the present resistance value to calculate the dischargeable electric power during discharge of the electric storage apparatus.

4. The electric storage system according to claim 1, wherein the controller corrects the present internal resistance value to a value higher than the present internal resistance value in calculating the present internal resistance value to calculate the dischargeable electric power during charge of the electric storage apparatus.

5. The electric storage system according to claim 1, wherein the controller uses the present internal resistance value instead of the predetermined internal resistance value to calculate the dischargeable electric power when the present internal resistance value is higher than the predetermined internal resistance value.

6. An electric storage system comprising:
a voltage sensor detecting a voltage value of an electric storage apparatus;

a current sensor detecting a current value of the electric storage apparatus; and a controller setting an allowable charge electric power serving as an upper limit electric power to which charge of the electric storage apparatus is allowed, wherein the controller uses the detected voltage value, the detected current value, and a present internal resistance value of the electric storage apparatus that is calculated based on the detected voltage value and the detected current value, to calculate a reference voltage value, the reference voltage value being the voltage value when no current flows, the controller uses the reference voltage value and a predetermined internal resistance value to calculate a chargeable electric power, the predetermined internal resistance value being previously set to be higher than the present internal resistance value, the chargeable electric power being an electric power when a charge electric power of the electric storage apparatus is increased to cause the voltage value to reach an upper limit voltage value, and the controller sets the chargeable electric power as the allowable charge electric power when temporarily increasing the charge electric power required of the electric storage apparatus.

7. The electric storage system according to claim 6, wherein the controller calculates the chargeable electric power based on the following expression (II):

$$TWin = \frac{(Vb\_now + Ib\_now \times R\_now) - Vb\_high}{R\_old} \times Vb\_high \quad (II)$$

where, in the expression (II), TWin represents the chargeable electric power, Vb_now represents the detected voltage value, Ib_now represents the detected current value, R_now represents the present internal resistance value, Vb_high represents the upper limit voltage value, and R_old represents the predetermined internal resistance value.

8. The electric storage system according to claim 6, wherein the controller corrects the present internal resistance value to a value higher than the present internal resistance value in calculating the present internal resistance value to calculate the chargeable electric power during discharge of the electric storage apparatus.

9. The electric storage system according to claim 6, wherein the controller corrects the present internal resistance value to a value lower than the present internal resistance value in calculating the present internal resistance value to calculate the chargeable electric power during charge of the electric storage apparatus.

10. The electric storage system according to claim 6, wherein the controller uses the present internal resistance value instead of the predetermined internal resistance value to calculate the chargeable electric power when the present internal resistance value is higher than the predetermined internal resistance value.

* * * * *